United States Patent
Coker et al.

(10) Patent No.: US 10,494,160 B2
(45) Date of Patent: *Dec. 3, 2019

(54) PEEL-AWAY SHAKER CAN AND CAN MEMBRANE

(71) Applicant: SONOCO DEVELOPMENT, INC., Hartsville, SC (US)

(72) Inventors: Howard Coker, Hartsville, SC (US); Robert Thor Versluys, Florence, SC (US); Scott William Huffer, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,113

(22) Filed: May 4, 2018

(65) Prior Publication Data
US 2018/0251277 A1 Sep. 6, 2018

Related U.S. Application Data

(60) Continuation of application No. 14/880,406, filed on Oct. 12, 2015, which is a division of application No. 14/556,553, filed on Dec. 1, 2014.
(Continued)

(51) Int. Cl.
*B65D 53/08* (2006.01)
*B32B 15/08* (2006.01)
(Continued)

(52) U.S. Cl.
CPC ............ *B65D 53/08* (2013.01); *B32B 3/266* (2013.01); *B32B 7/06* (2013.01); *B32B 7/12* (2013.01);
(Continued)

(58) Field of Classification Search
CPC .......... B32B 7/06; B32B 7/02; B65D 77/2024
(Continued)

(56) References Cited

U.S. PATENT DOCUMENTS 3,318,495 A    5/1967   Roberts
3,358,873 A    12/1967  Gelber
(Continued)

FOREIGN PATENT DOCUMENTS

EP    0040797    12/1981
EP    2347972    7/2011
(Continued)

OTHER PUBLICATIONS

Non-Final Office Action for U.S. Appl. No. 14/880,406 dated Jun. 21, 2017.
(Continued)

*Primary Examiner* — Anthony D Stashick
*Assistant Examiner* — Raven Collins
(74) *Attorney, Agent, or Firm* — Nelson Mullins Riley & Scarborough, LLP (57) ABSTRACT

The present invention relates to container laminate and container having a container laminate through which materials may be accessed and/or dispensed. The laminate has multiple layers that are peeled away when opened to reveal one or more openings in a layer that remains adhered to the container after opening.

18 Claims, 9 Drawing Sheets

Related U.S. Application Data (60) Provisional application No. 61/913,082, filed on Dec. 6, 2013.

(51) Int. Cl.

| | | |
|---|---|---|
| *B32B 3/26* | (2006.01) | |
| *B32B 7/06* | (2019.01) | |
| *B32B 7/12* | (2006.01) | |
| *B32B 27/08* | (2006.01) | |
| *B65D 77/20* | (2006.01) | |
| *B65D 65/14* | (2006.01) | |
| *B32B 27/10* | (2006.01) | |
| *B32B 27/36* | (2006.01) | |
| *B65D 41/62* | (2006.01) | |

(52) U.S. Cl.
CPC .............. *B32B 15/08* (2013.01); *B32B 27/08* (2013.01); *B32B 27/10* (2013.01); *B32B 27/36* (2013.01); *B65D 41/62* (2013.01); *B65D 65/14* (2013.01); *B65D 77/2024* (2013.01); *B32B 2307/7244* (2013.01); *B32B 2307/7246* (2013.01); *B32B 2435/02* (2013.01)

(58) Field of Classification Search
USPC .................. 220/359, 270; 428/35.7, 35.8
See application file for complete search history.

(56) References Cited

U.S. PATENT DOCUMENTS

| | | | |
|---|---|---|---|
| 3,682,366 | A | 8/1972 | Chung |
| 4,126,263 | A | 11/1978 | Mårtensson |
| 4,132,328 | A | 1/1979 | Zundel |
| 4,390,104 | A | 6/1983 | Cummings |
| 4,428,494 | A | 1/1984 | Hirota et al. |
| 4,965,113 | A * | 10/1990 | Jones .................. C09J 7/20 428/41.9 |
| 5,125,529 | A * | 6/1992 | Torterotot ............ B65D 77/206 215/232 |
| 5,407,107 | A | 4/1995 | Smith |
| 5,513,781 | A * | 5/1996 | Ullrich ................. B65D 47/185 215/232 |
| 5,626,929 | A * | 5/1997 | Stevenson ................. B32B 7/12 215/232 |
| 5,688,544 | A | 11/1997 | Bolton et al. |
| 5,709,310 | A | 1/1998 | Kretz |
| 5,776,284 | A | 7/1998 | Sykes et al. |
| 5,851,333 | A * | 12/1998 | Fagnant .................. B32B 38/04 156/252 |
| 6,056,141 | A | 5/2000 | Navarini et al. |
| 6,669,046 | B1 | 12/2003 | Sawada |
| 6,685,058 | B2 | 2/2004 | Redmond |
| 7,143,910 | B2 | 12/2006 | Redmond |
| 8,201,385 | B2 | 6/2012 | McLean |
| 8,354,132 | B2 | 1/2013 | Stephens et al. |
| 8,523,837 | B2 | 9/2013 | Wiggins et al. |
| 8,686,324 | B2 | 4/2014 | Su et al. |
| 2005/0230384 | A1 | 10/2005 | Robison et al. |
| 2005/0276525 | A1 | 12/2005 | Hebert |
| 2007/0298077 | A1 | 12/2007 | Jones |
| 2009/0314773 | A1 | 12/2009 | Kanzaki et al. |
| 2010/0247822 | A1 | 9/2010 | Ziolkowski |
| 2010/0278454 | A1 | 11/2010 | Huffer |
| 2011/0163105 | A1 | 7/2011 | Su et al. |
| 2012/0288660 | A1 | 11/2012 | Maseiker et al. |
| 2012/0308690 | A1 | 12/2012 | Holmen |
| 2013/0020324 | A1 | 1/2013 | Thorstensen-Woll et al. |
| 2013/0056469 | A1 | 3/2013 | Davis et al. |
| 2014/0048438 | A1 | 2/2014 | Woo |
| 2014/0166652 | A1 | 6/2014 | Su et al. |
| 2014/0170359 | A1 * | 6/2014 | Schwitte ............... E04F 15/107 428/41.5 |
| 2015/0041470 | A1 | 2/2015 | Huffer et al. |
| 2015/0158643 | A1 | 6/2015 | Coker et al. |
| 2016/0031619 | A1 | 2/2016 | Coker et al. |

FOREIGN PATENT DOCUMENTS

| | | |
|---|---|---|
| JP | 2007039107 | 2/2007 |
| WO | WO 2009/151901 A1 | 12/2009 |
| WO | WO 2012/073274 A1 | 6/2012 |

OTHER PUBLICATIONS

Non-Final Office Action for U.S. Appl. No. 14/880,406 dated Mar. 22, 2018.
Final Office Action for U.S. Appl. No. 14/880,406 dated Nov. 16, 2017.
Final Office Action for U.S. Appl. No. 14/880,406 dated Jan. 10, 2017.
Non-Final Office Action for U.S. Appl. No. 14/880,406 dated Apr. 4, 2016.
International Search Report and Written Opinion for International Application No. PCT/US2014/068519 dated Feb. 19, 2015.
International Preliminary Search Report on Patentability for International Application No. PCT/US2014/068519, filed Dec. 4, 2014.
Non-Final Office Action for U.S. Appl. No. 14/556,553 dated Apr. 11, 2018.
Non-Final Office Action for U.S. Appl. No. 14/556,553 dated Nov. 29, 2017.
Non-Final Office Action for U.S. Appl. No. 14/556,553 dated May 26, 2017.
Final Office Action for U.S. Appl. No. 14/556,553 dated Jan. 9, 2017.
Non-Final Office Action for U.S. Appl. No. 14/556,553 dated Aug. 11, 2016.
Final Office Action for U.S. Appl. No. 14/556,553 dated Mar. 30, 2016.
Non-Final Office Action for U.S. Appl. No. 14/556,553 dated Dec. 17, 2015.
Non-Final Office Action for U.S. Appl. No. 14/556,553 dated Jun. 10, 2015.
Office Action for Canadian Patent Application No. 2,932,889 dated Oct. 12, 2017.
H.S. Crocker, Heat seal film with a unique last-etched layer, Dairy Foods Magazine, Dec. 2014, p. 54, U.S.
"Flexographic Printing, Laminating and Preformed Products," American Packaging Corporation, 2013, pp. 2-3.
Non-Final Office Action for U.S. Appl. No. 14/556,553 dated Sep. 14, 2018.

* cited by examiner

PEEL-AWAY SHAKER CAN AND CAN MEMBRANE

CROSS-REFERENCE TO A RELATED APPLICATIONS

This application is a continuation of U.S. patent application Ser. No. 14/880,406, filed Oct. 12, 2015, which is a divisional of U.S. patent application Ser. No. 14/556,553, filed Dec. 1, 2014, both of which are incorporated herein in their entirety by reference.

The present application claims priority to U.S. Provisional Patent Application No. 61/913,082, filed Dec. 6, 2013, incorporated herein by reference in its entirety.

FIELD OF THE INVENTION

The present invention relates generally to containers for housing and dispensing materials that can be shaken or withdrawn from the container through one or more openings, and more particularly to peel-away membranes employed in such containers.

BACKGROUND OF THE INVENTION

Containers are often employed for housing dispensing granular materials, particularly in the food industry. Salt, pepper, cinnamon, and sugar are among the various materials that can be dispensed from a container, typically through holes or orifices cut in a member or top of the container. While the present invention is useful in the food product industry, the invention is not limited thereto, and the invention may be used for any container from which a product is dispensed and for which the present peel-away shaker designs and configurations may be employed. One such exemplary dispensed granular material is powdered carpet deodorizer. Moreover, the laminate membrane may be employed on containers made of any types of materials, including plastics, composites, papers, and any other container-making material.

Other containers that have peel-away membranes have one or more openings through which product may be accessed. For example, certain containers may have openings through which a spoon, straw, or other utensil may be inserted so that product within the container may be withdrawn.

SUMMARY OF THE INVENTION

According to one aspect, a multi-layered peel-away dispensing laminate is provided that includes a metalized polymeric layer for adhering to a container wherein the metalized polymer layer has an upper surface and a lower surface, the metalized polymeric layer defining at least one diecut opening therethrough; a pressure sensitive adhesive adhered to at least a portion of the upper surface of the metalized polymeric layer; and a peelable film layer having an upper surface and a lower surface wherein the lower surface of the peelable film layer is adhered to at least a portion of the upper surface of the metalized polymeric layer by the pressure sensitive adhesive According to an aspect, the present invention provides a multi-layered peel-away dispensing laminate that may have a metalized polymeric layer for adhering to a container wherein the metalized polymer layer has an upper surface and a lower surface, the metalized polymeric layer defining at least one opening therethrough; a pressure sensitive adhesive adhered to at least a portion of the upper surface of the metalized polymeric layer; a peelable film layer having an upper surface and a lower surface wherein the lower surface of the peelable film layer is adhered to at least a portion of the upper surface of the metalized polymeric layer by the pressure sensitive adhesive; an adhesive layer adhered to the upper surface of the peelable film layer; and a paper layer adhered to the upper surface of the peelable film layer by the adhesive layer.

According to another aspect, the present invention provides a container having a multi-layered peel-away dispensing laminate that may have a metalized polymeric layer for adhering to a container wherein the metalized polymer layer has an upper surface and a lower surface, the metalized polymeric layer defining at least one opening therethrough; a pressure sensitive adhesive adhered to at least a portion of the upper surface of the metalized polymeric layer; a peelable film layer having an upper surface and a lower surface wherein the lower surface of the peelable film layer is adhered to at least a portion of the upper surface of the metalized polymeric layer by the pressure sensitive adhesive; an adhesive layer adhered to the upper surface of the peelable film layer; and a paper layer adhered to the upper surface of the peelable film layer by the adhesive layer.

According to another aspect, the present invention provides a method for opening a container for dispensing granular particles therefrom wherein the container has a multi-layered peel-away dispensing laminate that may have a metalized polymeric layer for adhering to a container wherein the metalized polymer layer has an upper surface and a lower surface, the metalized polymeric layer defining at least one opening therethrough; a pressure sensitive adhesive adhered to at least a portion of the upper surface of the metalized polymeric layer; a peelable film layer having an upper surface and a lower surface wherein the lower surface of the peelable film layer is adhered to at least a portion of the upper surface of the metalized polymeric layer by the pressure sensitive adhesive; an adhesive layer adhered to the upper surface of the peelable film layer; and a paper layer adhered to the upper surface of the peelable film layer by the adhesive layer, wherein the peelable film and paper layers are peeled away from the metalized polymeric layer.

According to another aspect, the present invention provides a method for opening a container for accessing products housed within the container wherein the container has a multi-layered peel-away dispensing laminate that may have a metalized polymeric layer for adhering to a container wherein the metalized polymer layer has an upper surface and a lower surface, the metalized polymeric layer defining at least one opening therethrough; a pressure sensitive adhesive adhered to at least a portion of the upper surface of the metalized polymeric layer; a peelable film layer having an upper surface and a lower surface wherein the lower surface of the peelable film layer is adhered to at least a portion of the upper surface of the metalized polymeric layer by the pressure sensitive adhesive; an adhesive layer adhered to the upper surface of the peelable film layer; and a paper layer adhered to the upper surface of the peelable film layer by the adhesive layer, wherein the peelable film and paper layers are peeled away from the metalized polymeric layer.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to certain embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

In one embodiment, a beaded composite can with a die-cut multi-layer laminate membrane to create a dispensing feature for use in shaker applications is provided and exemplified herein. Specifically, such a die-cut laminate membrane may replace the typical rigid metal or plastic shaker tops on a powdered shaker dispenser (e.g., salt, pepper, or spice shakers or carpet powder shakers, etc.). Additionally, the laminate may also have registered graphics for advertising and color printing. Such printing may be on the surface of a layer or between the layers of film to create various gaming, couponing, or other promotional features. The laminate die-cut pattern may be customized for the particular product to be dispensed or accessed. The patterns can be any shape, size, or configuration to create an opening for shake-dispensing of a powder, creating a spoon slot, or creating a pour spout.

Figure 1:
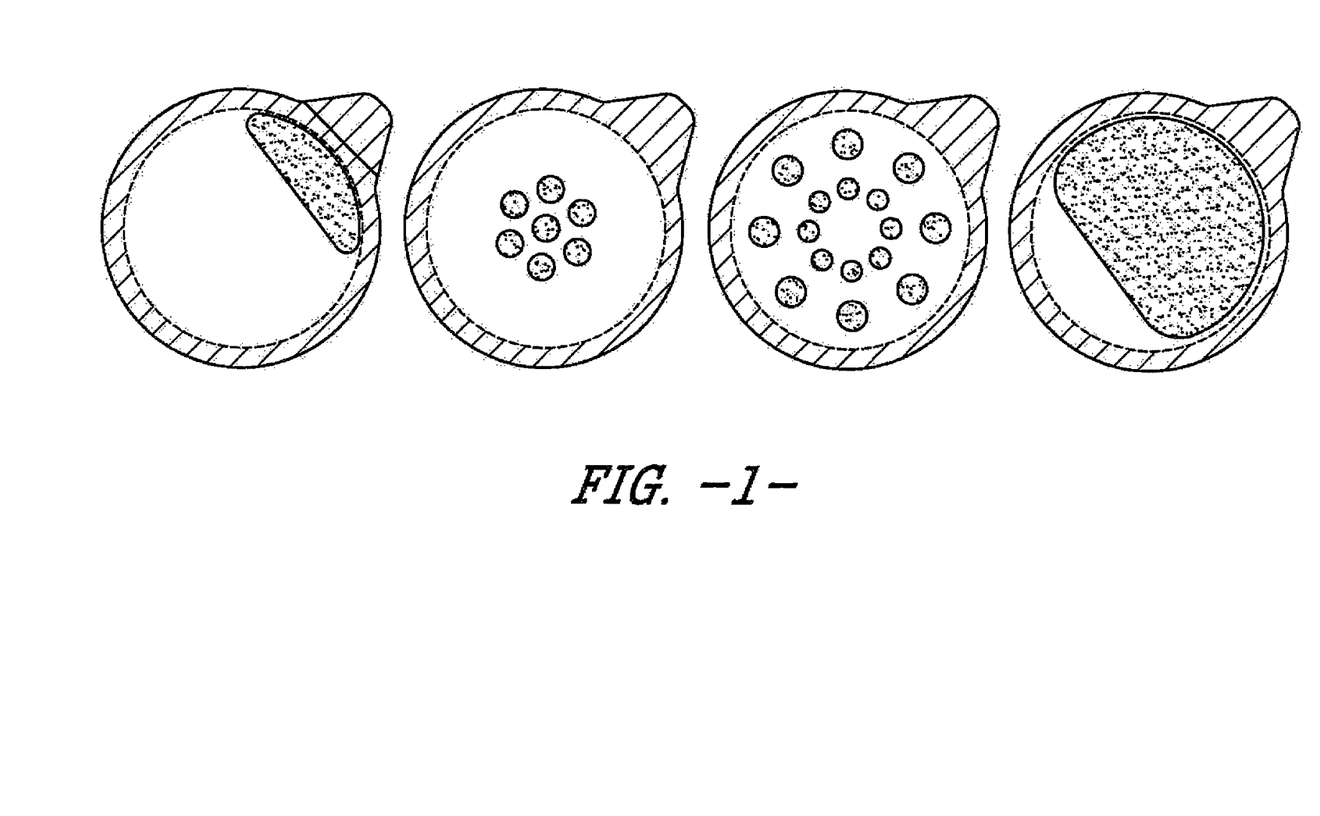
FIG. 1 shows exemplary opening designs for dispensing of and/or access to materials from containers of the present invention.

Various configurations for the container openings through which products may be dispensed or accessed are illustrated in FIG. 1. However, the invention is not limited to any particular container opening and any opening through which product may be dispensed or access is applicable hereto.

In most embodiments, the openings will be die-cut through the laminate structures employed for the membranes that seal the containers. An exemplary structured laminate may be constructed in the layered format shown in FIG. 2.

Figure 2:
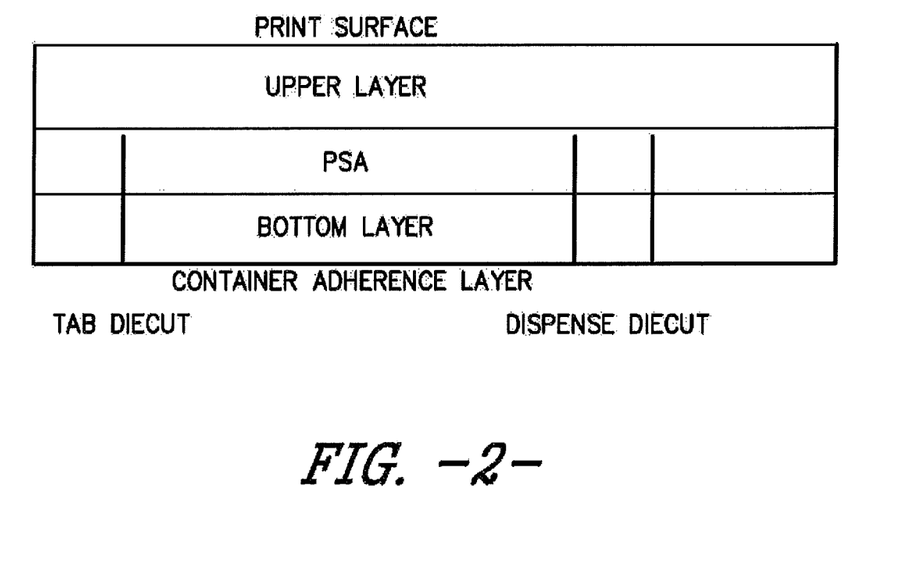
FIG. 2 is a side view showing layers of an exemplary laminate of a first embodiment of the present invention.

As shown in FIG. 2, the upper layer of the laminate may have a print surface. For example, the upper layer may be paper, film, foil, or anything printable on at least one surface. The printable surface will be the outer surface of the laminate that is visible to the consumer when viewing the top of the container.

The next layer below the upper layer is a pressure sensitive adhesive layer (PSA). It is used for attaching the lower surface of the upper printable layer to the upper surface of a bottom layer that is a peel-away (i.e., release) layer. In certain embodiments, the PSA may be a water-based acrylic PSA.

The bottom layer is typically a oriented polypropylene (mOPP) material and a layer such as a film, polyethylene, polyethylene terephthalate (PET), etc. that is adhered to the container. Die-cuts are made through the bottom layer for both the tab release feature described herein as well as for the dispensing aspects.

Figure 3:
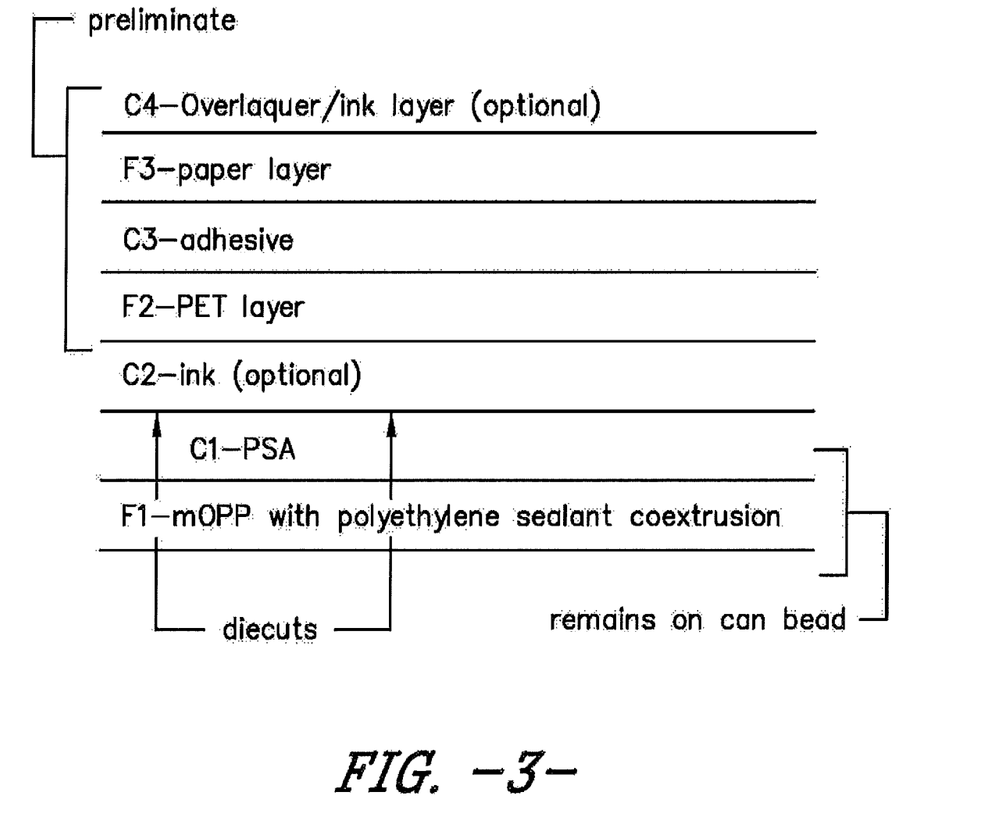
FIG. 3 is a side view showing layers of another exemplary laminate of a second embodiment of the present invention.

Another, more detailed laminate structure, is shown in FIG. 3. As shown in FIG. 3, the bottom-most layer (F1) is a metalized oriented polypropylene (mOPP) material sealed with a polyethylene sealant. Oriented polypropylene (OPP) is a known packaging multilayer film with a surface layer that is heat weld/seal compatible with high density polyethylene (HDPE) resins. The sealant layer may be modified with any polymer material to promote additional adhesion to the selected container to which the laminate is adhered, particularly rigid containers. In addition, when used in the present invention, this layer may, optionally, have a vacuum-deposited aluminum on one side to create an improved barrier and shiny metallic look. The sealable side is located toward the interior of the dispenser and the shiny, metalized side will be facing outward adjacent to the next PSA (C1) layer. The typical thickness of the mOPP layer may be about 0.0011 inch, but other thicknesses may be utilized as well.

The layer adjacent to the mOPP layer is a pressure sensitive adhesive (PSA) layer (C1). This layer may be applied to the layered laminate by several processes, including a registered pattern gravure process.

The next layer is an optional ink layer (C2). If included, it can be a primer layer or, optionally, it can contain graphics for advertising purposes.

The layer adjacent the adhesive PSA layer may be a biaxially-oriented clear polyester polyethylene terephthalate (PET) film layer (F2). The thickness of the PET may vary according to the particular environment, but may typically have a thickness of 0.00092 inch. In addition, the PET layer may be a metalized or coated PET film, or other similar layer designed to promote barrier properties against moisture and oxygen. It could also be another film type such as OPP or oriented polyamide (OPA), which is commonly known as nylon film.

The next layer is an adhesive layer (C3) to bind the outer paper layer to the PET layer. The adhesive layer, in some embodiments, can be a urethane adhesive or, alternatively, the layer can be extruded with polyethylene. Any number of adhesives, known to those in the art, that are sufficient to adhere the paper layer to the PET layer may be used.

The next layer is the paper layer (F3), which may be formed of a paper (such as a 35 lb/ream bleached kraft that is coated on one side with a clay-based coating). Ink is then printed onto the clay-coated paper layer surface by a printing process such as flexo or gravure printing.

Finally, an optional overlaquer (OL) layer (C4) may be applied as the final, outer layer in order to provide a protective coating over the ink.

The peel-away features of the present membrane are provided by a scoremarking process as follows. A tab scoremark allowing the laminate to split between the PSA layer (C1) and the mOPP layer (F1) so that the top layers that include the PSA layer (C1) and all layers above (C2, F2, C3, F3, C4) may be peeled away from the container when opening, while allowing the mOPP layer (F1) to remain heat-welded to the can. In addition, if the optional ink layer is included between the PSA (C1) and PET (F2) layers as explained above, the ink layer will removed along with the upper layers.

Figure 4:
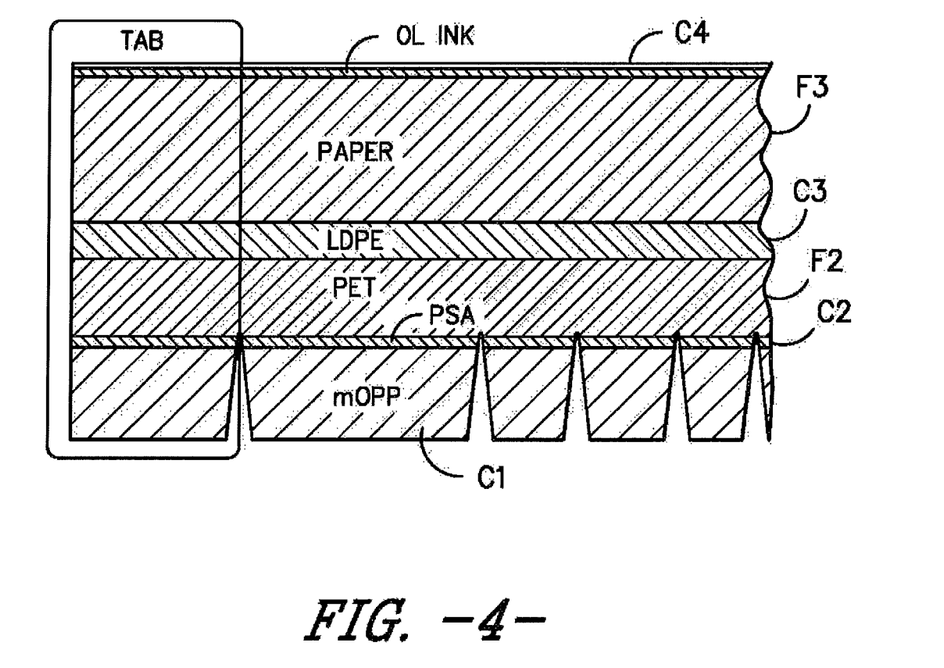
FIG. 4 is a side view showing the laminate structure of the second embodiment shown in FIG. 3 before opening.
Figure 5:
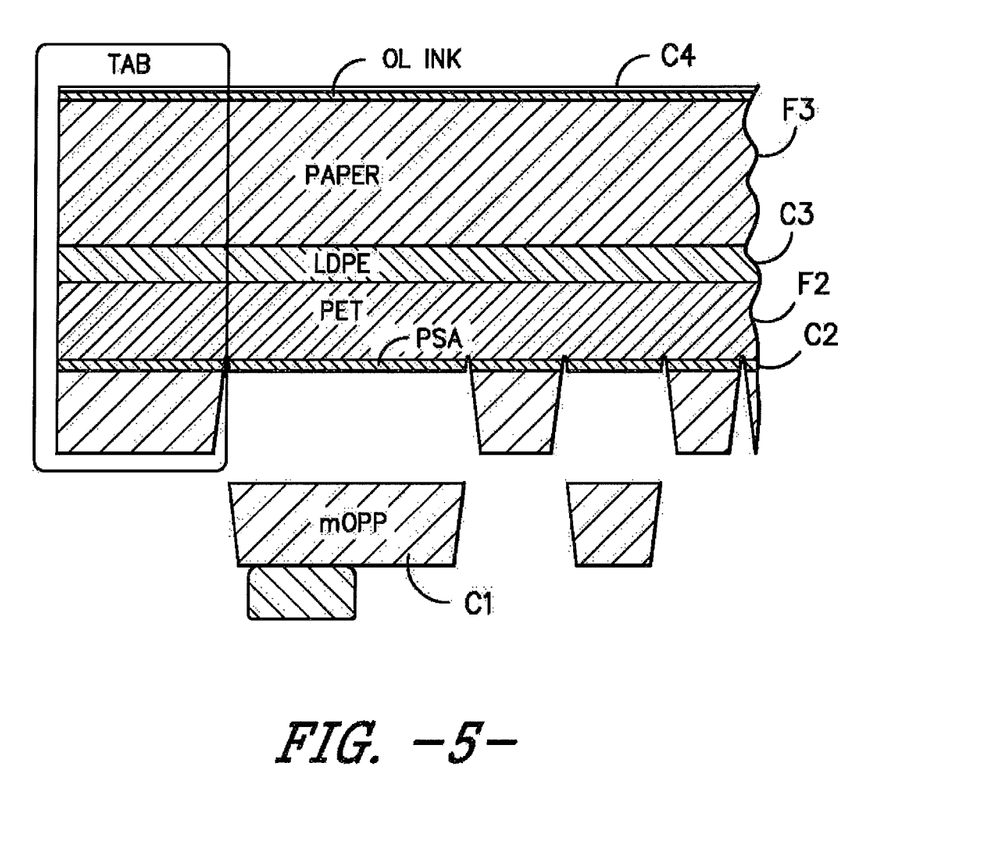
FIG. 5 is a side view showing the laminate structure of the second embodiment shown in FIG. 3 after opening.

The structure of the laminate membrane before opening is illustrated in FIG. 4 and the structure of the laminate membrane after opening is illustrated in FIG. 5.

Figure 6:
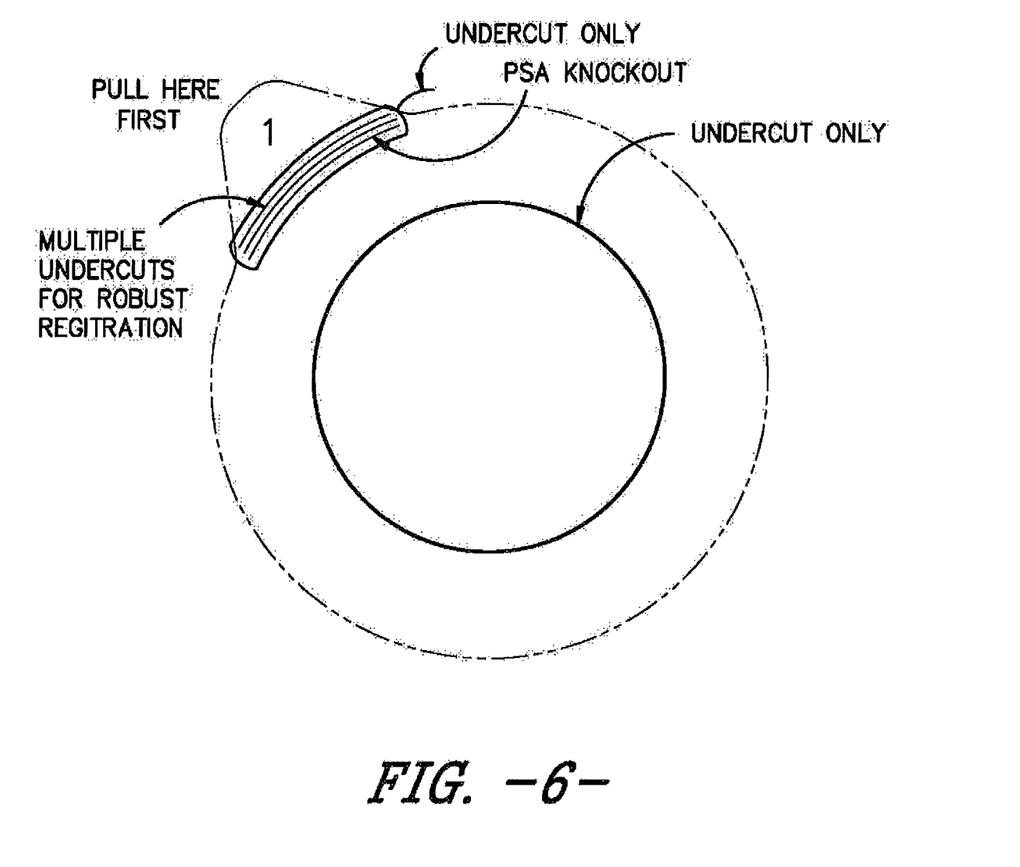
FIG. 6 is a top view of an exemplary undercut laminate of the present invention.

In other alternative embodiment, other cuts, such as the multiple undercuts shown in FIG. 6 may be utilized to allow for robust registration and/or a PSA knockout(s). In such embodiments, the undercuts direct force away from the bead and to the PSA/mOPP interface during peeling away and opening of the container. As shown in FIG. 5, the original single die-cut line that was the initiator of laminate split has been replaced. Multiple parallel/concentric lines makes it easier for the lamination split to occur and will make the membrane more robust to changes in registration. In addition, multiple/concentric undercuts increase the odds that a tab die-cut is adjacent to the seal area on the bead.

Figure 7A:
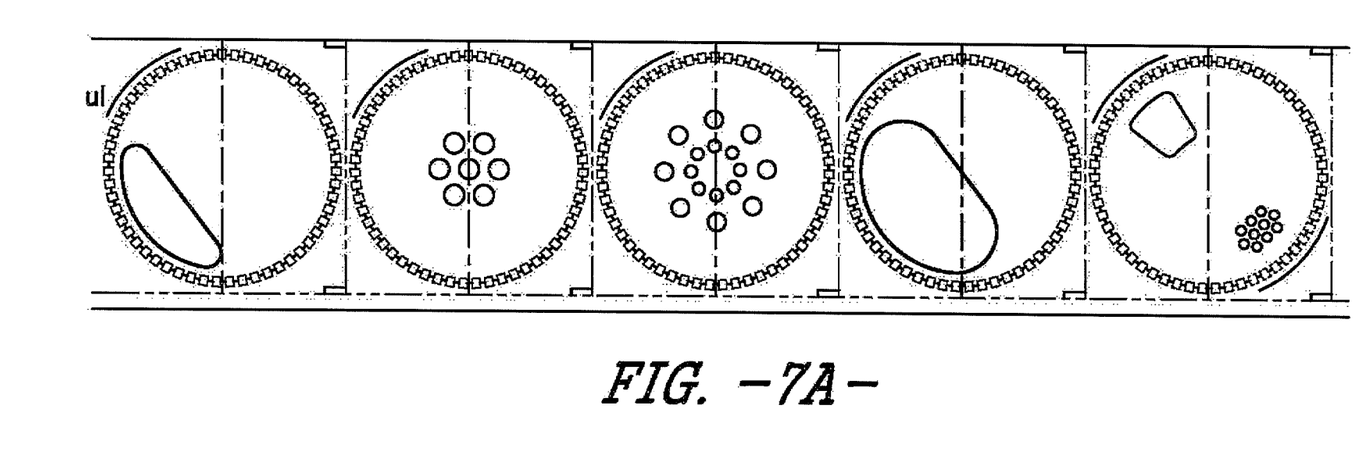
FIGS. 7A and 7B show additional exemplary designs for the openings for dispensing of and/or access to materials from containers of the present invention.
Figure 7B:
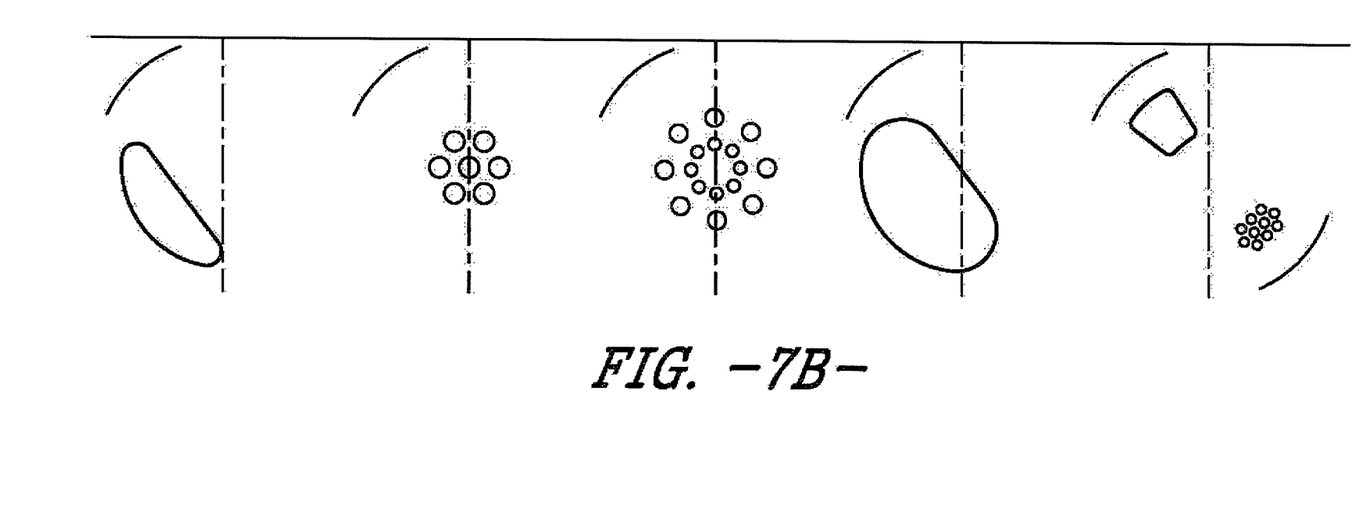

Additional designs for the die-cut openings are shown in FIG. 7A, wherein PSA Knockouts are shown in green. The corresponding undercut dies for such openings are shown in FIG. 7B.

Secondly, in the designs shown in FIGS. 4 and 5, the PSA layer (C1) is shown as having 100% coverage and without skips. The "PSA Knockout" shown in FIG. 8, which also illustrates the multiple undercuts, means that the PSA is pattern-applied (and registered to the die-cuts) so that there is no PSA in that area. This further facilitates easy lamination splitting because there is no adhesion at this area as it will be "pre-split". The force applied during opening is directed at the peel-off layer (top label removal) and not at the interface between the mOPP and the adhesive bead on the rim of the container.

Figure 8A:
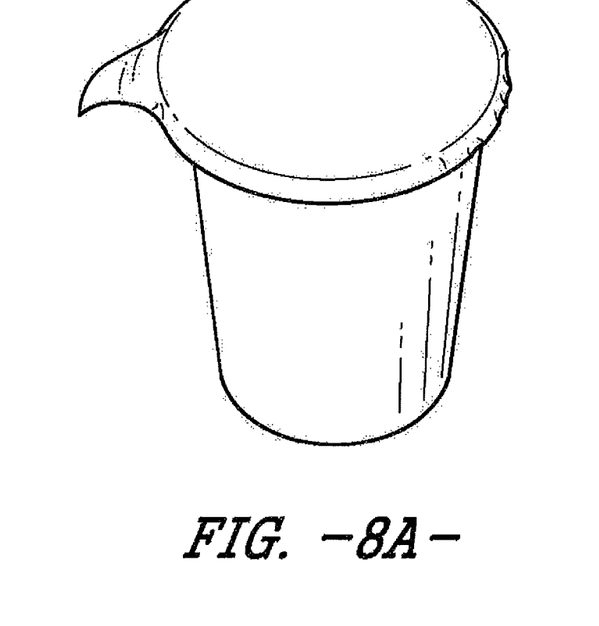
FIGS. 8A-8D are photographs of a prototype structure of the present invention showing the process of opening the container and peeling away the present inventive laminate membrane.
Figure 8B:
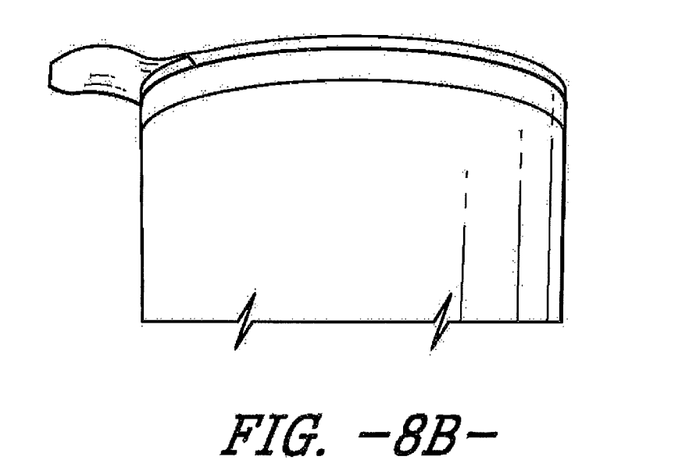

An embodiment of the invention and the process employed for opening a container employing the present invention are shown in the photographs in FIGS. 8A-8D. FIG. 8A shows the top of the laminate structure, with a view of the upper paper layer (F3), mounted onto a container. In this particular prototype, no ink or overlaquer layer is employed. FIG. 8B shows a bottom view of the tab that is used to pull the peel-away components of the membrane when opening the container. The bright metallic structure is a portion of the metalized OPP (mOPP) layer F1.

Figure 8C:
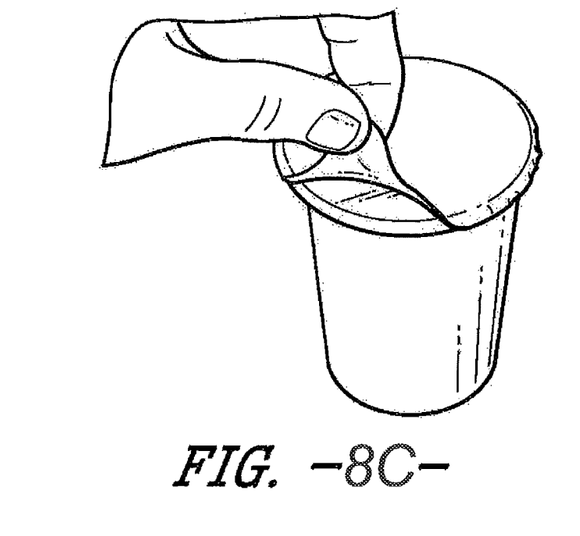
Figure 8D:
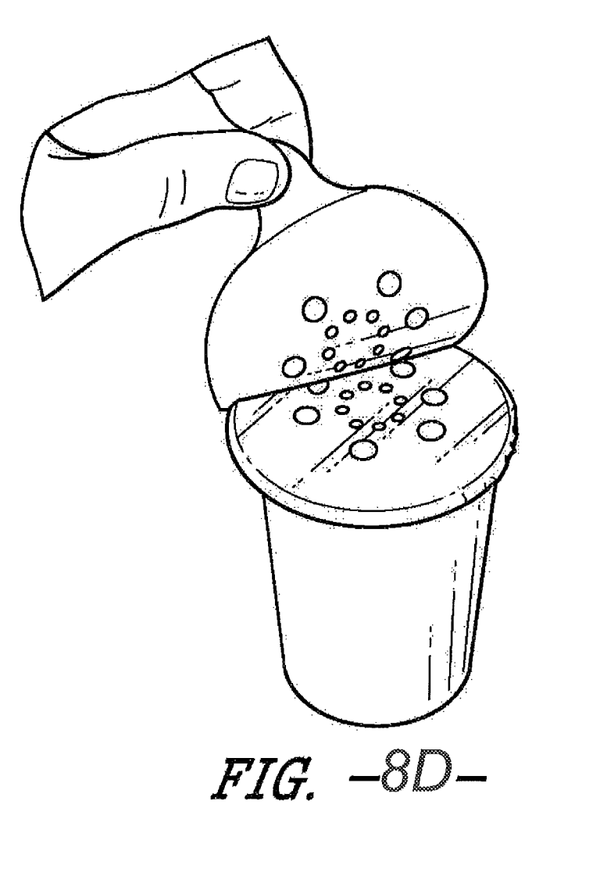

Opening of the container is initiated as shown in FIG. 8C with the tab being grasped and the peel-away beginning. The white of the paper layer is seen from below and through the transparent PSA/optional layer and adhesive. The splitting of the layers happens at the score mark that is situated between the tab and the edge of the can. FIG. 8D illustrates the further pulling away of the layers that reveals a pattern of perforations. Where there are holes in the mOPP layer, there is a corresponding metallic circle that remains adhered to the PSA. The holes in the mOPP layer remaining adhered to the container opening are employed for dispensing a granular material in this exemplary embodiment.

EXAMPLES

The following variations of the laminate of the present invention were created and tested for use as peel-away laminate membranes. However, it is to be understood that the components of the membranes set forth herein are exemplary in nature only and that any components capable of performing the specific performances required for the working of the invention described herein may be utilized.

TABLE 1

| Layer* | Example 1 | Example 2 | Example 3 | Example 4 | Example 5 |
|---|---|---|---|---|---|
| C4 | overlaquer/1 color ink | overlaquer/1 color ink | overlaquer/1 color ink | overlaquer/1 color ink | overlaquer/1 color ink |
| F3 | 30# Paper | 30# Paper | 30# Paper | 70# Paper | 70# Paper |
| C3 | 2 part urethane | 2 part urethane | 2 part urethane | 2 part urethane | 2 part urethane |
| F2 | 0.00092" PET | 0.00092" PET | 0.00092" PET | 0.00092" PET | 0.00092" PET |
| C2 | Ink primer for PSA | Ink primer for PSA | Ink primer for PSA | Ink primer for PSA | Ink primer for PSA |
| C1 | Pattern PSA | Pattern PSA | 100% PSA flood coat with pattern PSA at certain points | Pattern PSA | Pattern PSA |
| F1 | 0.0011" mOPP | 0.0011" mOPP | 0.0011" mOPP | 0.0011" mOPP | 0.0011" mOPP |

*Layers refer to the layers as shown in FIG. 2

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the versions contained therein.

What is claimed is:

1. A container comprising:
   a container body having a closed end and an open dispensing end opposite the closed end, wherein the open dispensing end comprises a rim; and
   a multi-layered peel-away dispensing laminate covering the open dispensing end, the laminate comprising:

a polymeric layer having an upper surface and a lower surface, wherein the lower surface of the polymeric layer is permanently adhered to the rim of the open dispensing end, and wherein the polymeric layer defines at least one perforation line or scoremark defining a removable portion of the polymeric layer;

a peelable film layer having an upper surface and a lower surface, wherein the lower surface of the peelable film layer is adhered to the upper surface of the polymeric layer by a pressure sensitive adhesive layer, wherein the pressure sensitive adhesive layer covers the entire surface between the peelable film layer and the polymeric layer, and wherein when the peelable film layer is peeled away, the removable portion of the polymeric layer remains adhered to the peelable film layer;

a tab disposed in the peelable film layer; and multiple undercut scoremarks in the polymeric layer, located circumferentially adjacent the tab, and disposed such that the scoremarks will be adjacent the seal position of the laminate on the rim of the container, wherein the multiple undercut scoremarks comprise parallel lines.

2. The container of claim 1, wherein the perforation line or score mark comprises a closed shape.

3. The container of claim 1, comprising a plurality of perforations or score marks in the polymeric layer.

4. The container of claim 1, wherein the polymeric layer is metalized.

5. The container of claim 1, comprising an adhesive layer adhered to the upper surface of the peelable film layer and a paper layer adhered to the upper surface of the peelable film layer by the adhesive layer.

6. The container of claim 1, wherein the paper layer comprises an ink.

7. The container of claim 6, further comprising an overlaquer adhered to the upper surface of the paper layer and over the ink.

8. A container comprising:
a container body having a closed end and an open dispensing end opposite the closed end, wherein the open dispensing end comprises a rim; and
a multi-layered peel-away dispensing laminate covering the open dispensing end, the laminate comprising:
a polymeric layer having an upper surface and a lower surface, wherein the lower surface of the polymeric layer is permanently adhered to the rim of the open dispensing end, and wherein the polymeric layer defines at least one perforation line or scoremark defining a removable portion of the polymeric layer;

a peelable film layer having an upper surface and a lower surface, wherein the lower surface of the peelable film layer is adhered to the upper surface of the polymeric layer by a pressure sensitive adhesive layer, wherein the pressure sensitive adhesive layer covers the entire surface between the peelable film layer and the polymeric layer, and wherein when the peelable film layer is peeled away, the removable portion of the polymeric layer remains adhered to the peelable film layer;

a tab disposed in the peelable film layer; and multiple undercut scoremarks in the polymeric layer, located circumferentially adjacent the tab, and disposed such that the scoremarks will be adjacent the seal position of the laminate on the rim of the container wherein the multiple undercut scoremarks comprise concentric lines.

9. The laminate of claim 1, wherein the container contains granular particles.

10. The container of claim 9, wherein the at least one perforation line or score mark in the polymeric layer comprises a dispensing feature for the granular particles.

11. The container of claim 8, wherein the perforation line or score mark comprises a closed shape.

12. The container of claim 8, comprising a plurality of perforations or score marks in the polymeric layer.

13. The container of claim 8, wherein the polymeric layer is metalized.

14. The container of claim 8, comprising an adhesive layer adhered to the upper surface of the peelable film layer and a paper layer adhered to the upper surface of the peelable film layer by the adhesive layer.

15. The container of claim 8, wherein the paper layer comprises an ink.

16. The container of claim 15, further comprising an overlaquer adhered to the upper surface of the paper layer and over the ink.

17. The laminate of claim 8, wherein the container contains granular particles.

18. The container of claim 17, wherein the at least one perforation line or score mark in the polymeric layer comprises a dispensing feature for the granular particles.

* * * * *